United States Patent
Zhao et al.

(10) Patent No.: US 7,175,819 B2
(45) Date of Patent: Feb. 13, 2007

(54) REGENERATION OF CUPRIC ETCHANTS AND RECOVERY OF COPPER SULFATE

(75) Inventors: Gang Zhao, Sumter, SC (US); H. Wayne Richardson, Sumter, SC (US)

(73) Assignee: Phibro-Tech, Inc., Ridgefield Park, NJ (US)

( * ) Notice: Subject to any disclaimer, the term of this patent is extended or adjusted under 35 U.S.C. 154(b) by 200 days.

(21) Appl. No.: 11/071,108

(22) Filed: Mar. 4, 2005

(65) Prior Publication Data

US 2006/0196761 A1    Sep. 7, 2006

(51) Int. Cl.
*C01B 7/01* (2006.01)
*C01B 7/03* (2006.01)
*C01B 17/96* (2006.01)
*C01G 3/00* (2006.01)

(52) U.S. Cl. ............... 423/23; 423/34; 423/36; 423/41; 423/45; 423/482; 423/488; 423/557; 203/35; 422/1; 252/380; 424/637

(58) Field of Classification Search .............. 423/23, 423/34, 36, 41, 45, 482, 488, 557; 203/35; 422/1; 252/380; 424/637
See application file for complete search history.

(56) References Cited

U.S. PATENT DOCUMENTS

| 3,635,664 | A | | 1/1972 | Morimoto | 23/126 |
| 4,045,543 | A | * | 8/1977 | Sardisco | 423/482 |
| 4,604,175 | A | | 8/1986 | Naumov et al. | 204/151 |
| 5,013,395 | A | | 5/1991 | Blumberg et al. | 156/627 |
| 5,421,966 | A | | 6/1995 | Oxley | 204/94 |
| 5,520,814 | A | * | 5/1996 | Celi | 210/638 |
| 5,560,838 | A | | 10/1996 | Allies et al. | 216/93 |
| 2002/0114759 | A1 | * | 8/2002 | Cabello-Fuentes | 423/482 |

FOREIGN PATENT DOCUMENTS

| JP | 4-89316 | 3/1992 |
| JP | 11-158661 | 6/1999 |

OTHER PUBLICATIONS

A. Bandyopadhyay, *Treatment of Acid Pickling Waste of Metals*, Jr. of Industrial Pollution Control, 15, (2), 1999, pp. 239-247.
M. S. Kumar et al., *Recover of Acid from Pickling Liquors*, Environmental Engineering Science, vol. 15, No. 4, 1998, pp. 259-263.

* cited by examiner

*Primary Examiner*—Timothy C. Vanoy
(74) *Attorney, Agent, or Firm*—Morgan, Lewis & Bockius LLP

(57) ABSTRACT

Spent, acidic solutions comprising cupric chloride and hyrdrochloric acid from the copper etching process are regenerated by a process in which the acid is subjected to distillation with sulfuric acid. In one embodiment, the process comprises (a) providing a spent etchant comprising at least about 10% by weight chloride and at least about 5% dissolved copper; (b) adding at least about 2 moles of sulfuric acid per mole of dissolved copper to the spent etching solution, thereby converting copper chloride into hydrochloric acid and precipitated copper sulfate; (c) distilling the mixture from step (b) to vaporize at least a portion of the hydrochloric acid; (d) condensing at least a portion of the vaporized hydrochloric acid; (e) separating at least a portion of the precipitated copper sulfate from the residual liquid, wherein said residual liquid comprises sulfuric acid; and (f) reusing at least a portion of the residual liquid as a sulfuric acid source in step (b).

29 Claims, 3 Drawing Sheets

REGENERATION OF CUPRIC ETCHANTS AND RECOVERY OF COPPER SULFATE

CROSS-REFERENCE TO RELATED APPLICATIONS

N/A

STATEMENT REGARDING FEDERALLY SPONSORED RESEARCH OR DEVELOPMENT not applicable

INCORPORATION-BY-REFERENCE OF MATERIAL SUBMITTED ON A COMPACT DISC not applicable

SEQUENCE LISTING not applicable

FIELD OF THE INVENTION

The present invention relates to the regeneration of spent hydrochloric acid-based copper etchant solutions. More particularly, the present invention relates to the production and recovery of hydrochloric acid and of copper sulfate from spent hydrochloric acid-based copper etchant solutions.

BACKGROUND OF THE INVENTION

Copper etching is a complex oxidation-reduction process in which copper is converted from the metallic state into the ionic state, and the oxidizing agent is reduced. Acid solutions containing copper chloride are extensively used as etching solutions in the copper etching process. One such acid solution commonly used to etch printed circuit boards is a cupric chloride-based hydrochloric acid solution comprising water, HCl, CuCl2 and oxidizers.

The usual etching procedure involves placing a resist pattern over a sheet of laminated copper. The masked copper laminate is then brought into contact with the etching solution (i.e., the etchant), which dissolves the exposed copper and leaves behind the copper which is protected by the resist pattern. The etchant comprises hydrochloric acid and an oxidizer, and also typically cleans brighteners, inhibitors and the like. The reactions of the etching process that generate the waste cupric chloride are believed to be:

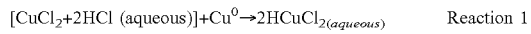
[CuCl$_2$+2HCl (aqueous)]+Cu$^0$→2HCuCl$_{2(aqueous)}$     Reaction 1

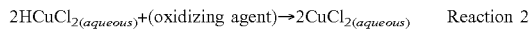
2HCuCl$_{2(aqueous)}$+(oxidizing agent)→2CuCl$_{2(aqueous)}$     Reaction 2

The copper etching process generally operates in the continuous mode. Hydrochloric acid and an oxidizer are added continuously, while a waste stream comprising cupric chloride is bled off continuously. Oxidizers used in the etching process can include, but are not limited to, hydrogen peroxide, chlorine, or sodium chlorate. The waste copper chloride generated in the etching process is typically shipped off-site for reclamation of the copper. This waste copper chloride solution is generally treated as a hazardous waste under the Resource Conservation and Recovery Act (RCRA), which increases the cost of shipping and handling. Additionally, waste chloride ions typically exit the process as a waste brine. Due to the high costs of shipping, handling, and treating these waste streams, there is more interest in on-site recycling.

Various processes have been used to treat other acidic waste streams. "Treatment of Acid Pickling Waste of Metals" by Bandyopadhyay in the Journal of Indian Pollution Control, 15(2), pages 259–265, 1999, discloses treatment processes for acid-based cleaning operations used in metal industries. Such treatment processes include neutralization, sedimentation, crystallization, and acid recovery. U.S. Pat. No. 3,635,664 to Morimoto discloses a process to regenerate a hydrochloric acid pickling waste stream. The process is used to convert FeCl$_2$ in the waste stream to FeSO$_4$. Similarly, "Recovery of Acid from Pickling Liquors" by Kumar et al. in Envron. Eng. Sci. 15(4), pages 259–260, 1998 discloses a resource recovery process to treat HCl-spent pickle liquors to recover 85% of the HCl and 86.5% pure FeSO4.

U.S. Pat. No. 5,013,395 to Blumberg et al. discloses a method of regenerating a metal-containing acid solution enhanced with a salt-free material. The metal dissolved in the acid solution is continuously oxidized by introducing a gas into a packed reaction vessel. U.S. Pat. No. 5,500,098 to Brown et al. discloses a process and apparatus for regenerating volatile acids containing metal salt impurities. U.S. Pat. No. 5,560,838 to Allies et al. discloses a process for converting an etchant into a non-hazardous material through a reaction with heated caustic (sodium hydroxide).

Generally, however, processes relating to copper have been more complex. U.S. Pat. No. 4,604,175 to Naumov et al. discloses an electrochemical reduction and oxidation (redox) process for regenerating an iron-copper chloride etching solution. U.S. Pat. No. 5,421,966 to Oxley discloses an electrolytic apparatus and process for the on-line regeneration of acidic cupric chloride etching baths. A preferred system utilizes a flow-through graphite or carbon anode and a flow-by cathode to allow more precise control of current and voltage. JP 04089316 to Sakata et al. discloses a method of recovering copper salts from hydrchloric acid-containing solutions, wherein solutions are dehydrochlorinated by electrodialysis or diffusion dialysis to remove the HCL. JP 11158661 to Hosoda discloses a process of extracting copper from a spent etching solution using acidic-based extractant solutions and electrolyzing the copper-containing acid solution to recover the copper.

The aforementioned references have inherent problems. For example, the energy costs associated with the electrochemical or electroytic processes for regenerating acidic etchant solutions are prohibitively high. The energy and handling costs associated with additional steps, such as evaporation, in distillation-based processes are also high. The shipping, handling, and transportation costs associated with caustic-based processes are also very high. Thus, there remains a need for an improved process to reclaim the materials in cupric chloride-based acid solutions, especially for a cost efficient process to reclaim usable or marketable products such as copper sulfate and hydrochloric acid from spent chloride-based copper etchant solutions.

SUMMARY OF THE INVENTION

Spent chloride-based copper etchant solutions typically comprise water, hydrochloric acid, and copper chloride. One of the key aspects of the present invention is to provide a process to regenerate a spent etching solution comprising cupric salts and to thereby reclaim a copper sulfate and hydrochloric acid at a strength at which it can be readily reused in the etching process.

In one embodiment, the present invention provides a process to regenerate a cupric chloride-containing etching solution. In another embodiment, the invention provides a process to regenerate a cupric chloride-containing etching solution comprising spent HCl, wherein the process results in the reclamation of etchable-grade HCl (that is, hydrochloric acid of sufficient strength and purity as to be readily reusable in the copper etchant formulation) and marketable $CuSO_4$ (that is, usable for purposes technical copper sulfate is typically used, for example, as animal feedstock, formation of copper powder, or incorporation into wood preservatives).

In one embodiment, the present invention provides a process for the regeneration of a spent etching solution comprising $CuCl_2$ and HCl, the process comprising the steps of:

(a) adding sulfuric acid to the spent etching solution to convert $CuCl_2$ to $CuSO_4$ and HCl to obtain a mixture with at least about 2 moles sulfuric acid per mole of Cu, preferably at least about 3 moles, alternately at least 5.5 moles, for example between about 4 moles and about 6 moles $H_2SO_4$ per mole copper, alternately between about 3.5 moles and about 5 moles of sulfuric acid per mole of dissolved copper;

(b) distilling the mixture from step (a) to vaporize and thereby remove substantially all, e.g., greater than 80%, preferably greater than 90%, for example between 95% and 99.9% by weight of the chloride, forming a vapor comprising HCl and water;

(c) condensing the vaporized HCl and water to recover hydrochloric acid, preferably wherein the hydrochloric acid is of sufficient purity and concentration that it can be readily used in the formulation of new copper etchant;

(d) separating the precipitated $CuSO_4$ from the residual liquid comprising excess sulfuric acid; and (e) optionally, but preferably, reusing at least a portion of the residual liquid as a sulfuric acid source in step (a). In one embodiment of the invention, the process for the regeneration of a spent etching solution operates on a continuous basis. In another embodiment, the process operates on a batch basis.

Other compounds that may be present in the spent copper etchant solution, and that may have an appreciable vapor pressure when in a strongly acidic composition, can be recovered with the hydrochloric acid. One example of this is hydrofluoric acid, which is a known adjuvant in some copper etchant compositions, and which can be recovered and reused in the hydrochloric acid recovery step.

In one embodiment, a pretreatment step is added, whereby the etchant is subjected to a distillation prior to adding $H_2SO_4$ to remove water, e.g., by boiling the water off of at a temperature preferably below about 120° C., for example between about 100 to 110° C., and at a pressure between about 0.8 and about 1.2 atmospheres. In one embodiment of the invention, step (a) further comprises concentrating the spent etching solution to a concentration of at least about 10, 15, 25, or 30 weight % chloride (as HCl). Generally, the higher the chloride fraction of the spent etchant, the less energy will be required to strip the chlorides and form usable (especially as an etchant) hydrochloric acid. Distillation of water is minimized by compositions having higher chloride content, and distillation of water is advantageously minimized as it is energy-intensive and costly. Alternatively or additionally, water can be removed by exposing the solution to a dessicant, for example anhydrous calcium sulfate (or even anhydrous copper sulfate). This material will absorb and bind with water, and can be regenerated by simple heating and reused many times. Alternatively or additionally, it can be economical in certain cases to add in step (a) fuming sulfuric acid, e.g., oleum, instead of sulfuric acid, which will have the effect of removing water.

Its important to add a considerable excess of sulfuric acid in step (a), e.g., at least about 2 moles sulfuric acid per mole of Cu, preferably at least about 3.5 moles, more preferably about 4.3 moles $H_2SO_4$ per mole copper, for example between about 3.5 moles and about 5 moles of sulfuric acid per mole of dissolved copper. Alternatively and preferably, the amount of sulfuric acid added is the larger of at least about 3 moles sulfuric acid per mole of Cu, preferably at least about 3.5 moles, more preferably between about 4 and about 5.5 moles $H_2SO_4$ per mole copper, or at least about 1 mole of sulfuric acid per 1.5 moles of chloride. While there is no upper limit on the quantity of sulfuric acid can be used, use of an amount greater than about 6 moles sulfuric acid per mole of Cu AND greater than about 1 mole of sulfuric acid per 1 mole of chloride is not necessary. Further, the incorporation of large excesses of sulfuric acid is not desirable, because vessels will need to be over-sized and because this acid must be heated during distillation and recovery of hydrochloric acid therefrom. The heat of mixing the sulfuric acid with the spent copper etchant will generate heat, and if not too large an excess of sulfuric acid is used, this heat can be used to raise the temperature of the composition to, or nearly to, the distillation temperature. In embodiments where the concentration of copper is large (e.g., greater than about 30 grams per liter), adding merely a stoichiometric amount of sulfate as sulfuric acid (e.g., a stoichiometric amount is the larger of one mole sulfuric acid per mole of dissolved copper, or one mole of sulfuric acid per 2 moles of chloride that is not HCl) will form a slush or solid on addition of the acid. It will then be difficult to distill off the hydrochloric acid and/or separate solid from entrained liquids, and the slush will not allow the crystals to be aged in strong acid to remove inclusions of dissolved copper chloride, so the quality (and marketability) of the recovered copper sulfate will be poor. In one embodiment of the invention, the composition in step (a) of the invention comprises, after adding the sulfuric acid, at least about 40% by weight sulfate (as sulfuric acid). In another embodiment, the composition in step (a) comprises at least 50% by weight sulfate (as sulfuric acid). In yet another embodiment, the composition in step (a) comprises at least 60% by weight sulfate (as sulfuric acid).

During steps (a) and (b), sulfate ions will be combining with available copper ions to form a copper sulfate precipitate. While the concentration of available water will influence whether the copper sulfate is primarily anhydrous, or in the monohydrate form, or in the pentahydrate form, other factors including the temperature are important, as will be discussed infra. In one embodiment of the invention, the distillation in step (b) occurs at a temperature of less than about 135° C. and a pressure equal to or less than about 1 atm. In another embodiment of the invention, the distillation in step (b) occurs at a temperature of less than about 130, 120, 110, 100, 90, 80, or 70° C., but advantageously at a temperature greater than about 55° C., and at a pressure of less than about 1.5 atm, typically at a pressure near atmospheric (e.g., between 0.9 and 1.2 atm), and in certain conditions at sub-atmospheric pressure, e.g., less than about 0.99 atm, 0.95 atm, 0.9 atm, or 0.8 atm, for example between about 0.5 and 0.8 atmospheres. The processes at these various pressures and temperatures are not equivalent. Generally, lower temperatures can be used if lower pressures are used. However, the concentration of the recovered hydrochloric acid and the form of copper sulfate recovered depend on the temperature and pressure.

In one embodiment of the invention, the distillation in step (b) occurs at a temperature of from about 95° C. to about 135° C., for example from about 120° C. to about 135° C. or from about 120° C. to about 130° C., where the distillation pressure in step (b) is advantageously less than about 1 atm.

The solid, precipitated copper sulfate can then be separated from the remaining liquid, which is typically a strong concentration of sulfuric acid. The solids can be separated from the liquid by simple settling and decanting. In one embodiment of the invention, the precipitated $CuSO_4$ is separated from the residual liquid comprising sulfuric acid by filtration. In another embodiment of the invention, the precipitated $CuSO_4$ is separated from the residual liquid comprising sulfuric acid by centrifugation. In any of the above, the solids can advantageously be washed to remove residual acid, and/or lime or other base can be added used as an anti-cake and acid neutralization agent.

In one embodiment of the invention, the recovered hydrochloric acid concentration in step (c) is from about 5 moles/liter to about 15 moles/liter, preferably from about 8.5 moles/liter to about 12 moles/liter, for example from about 9.5 moles/liter to about 10.5 moles/liter.

In one embodiment of the invention, the spent etching solution in step (a) contains from about 1 moles Cl/liter to about 20 moles Cl/liter, for example from about 2 moles Cl/liter to about 14 mol/liter, advantageously from about 6 moles Cl/liter to about 12 moles Cl/liter, and typically from about 4 moles Cl/liter to about 8 moles Cl/liter.

In one embodiment of the invention, the $CuSO_4$ can be used as a wood preservative. Alternately, the $CuSO_4$ can be used as a fungicide. In a first embodiment, the $CuSO_4$ is primarily in the form of a pentahydrate, and in another embodiment the $CuSO_4$ is primarily in the form of a monohydrate. Under very rigorous conditions where there is very little water in the liquid, the recovered solids may comprise anhydrous copper sulfate. Typically, the recovered $CuSO_4$ comprises both mono- and pentahydrate forms, though conditions can be altered to favor one form over another.

In one embodiment of the invention, the recovered $CuSO_4$ is at least 85%, more preferably at least 90%, and most preferably about 95% to about 99% by weight copper sulfate monohydrate. In another embodiment, the recovered $CuSO_4$ is at least 85%, more preferably at least 90%, and most preferably about 95% to about 99% by weight copper sulfate pentahydrate.

BRIEF DESCRIPTION OF THE DRAWINGS

In the attached drawings.

Figure 1:
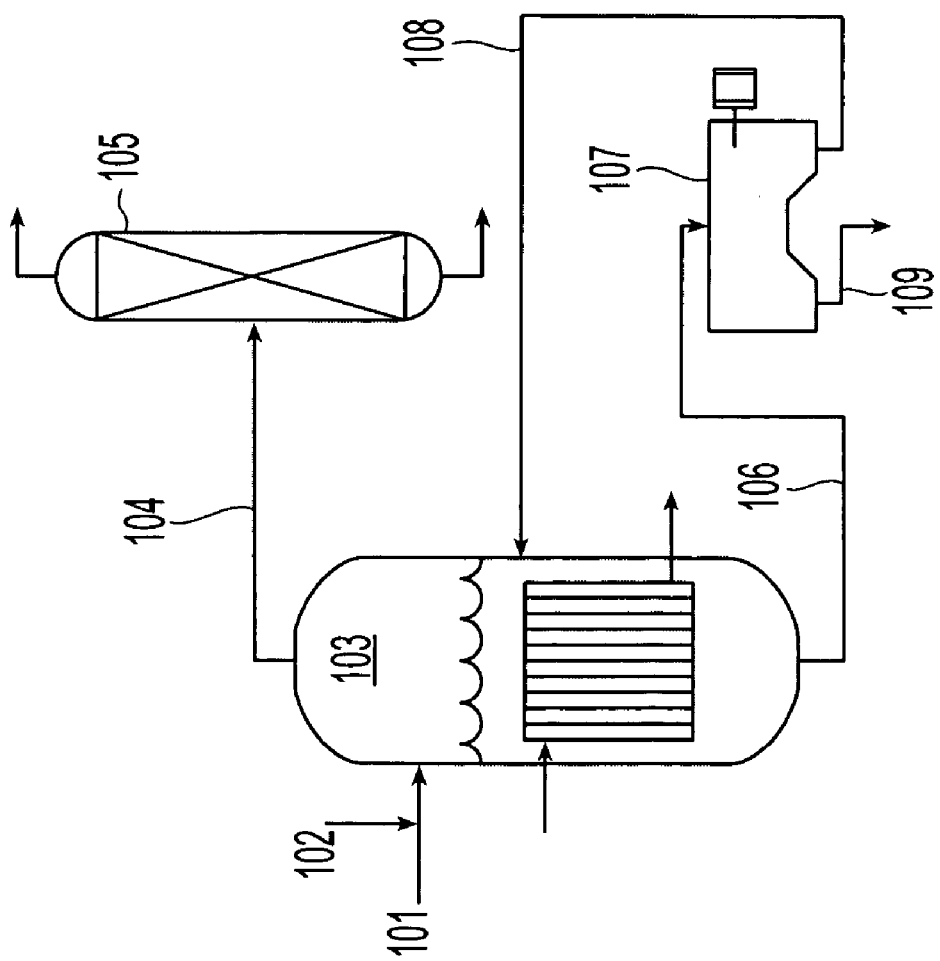
FIG. 1 is an overview of the in-house recycle process in the batch mode.

DETAILED DESCRIPTION OF THE
PREFERRED EMBODIMENTS

Unless otherwise specified, all compositions are given in percent, where the percent is the percent by weight based on the total weight of the entire composition, e.g., of the solution fluid, solid or slurry. In the event a composition is defined in "parts" of various components, this is parts by weight, such that if the value is not a ratio of parts then the total number of parts in the composition is between about 90 and about 110.

Spent etching solutions are generally classified as RCRA hazardous wastes under 40 Code of Federal Regulations (CFR) § 261. Accordingly, spent etching solutions must be managed both on-site and off-site under the laws and regulations of RCRA. This results in an increase in handling, transportation, storage, disposal, and general liability costs. One such way to minimize or eliminate these costs is in-house recycle of the spent etching solution. For example, closed loop recycle of the spent etching solution can exempt its classification as a hazardous waste altogether and virtually eliminate costs that result from the RCRA regulations. In situations in which the spent etching solution is not able to be exempted through closed loop recycle, in-house recycle can eliminate the need for off-site transportation, thus resulting in a cost savings. Additionally, in-house recycle can minimize the amount of waste byproducts which have to be handled as a hazardous waste.

In-house recycle of spent etching solutions is advantageous for other reasons. For example, in-house recycle can eliminate the need for purchasing hydrochloric acid for the etching process, as etchable-grade hydrochloric acid is regenerated in the recycle process. In-house recycle can also provide other marketable byproducts, including $CuSO_4$, which can be used as, for example, a preservative for treated wood products, as feed for livestock (provided the content of heavy metals is very low), and/or to manufacture copper powder.

In accordance with the present invention, sulfuric acid is added to the hydrochloric acid-based spent etching solution in an amount necessary to convert $CuCl_2$ in the spent etching solution to HCl and $CuSO_4$. There must be an excess of sulfuric acid added, e.g., at least 100% excess, and at dissolved copper concentrations in excess of 20% by weight at least 200% excess, and typically up to about 500% excess, based on the moles of dissolved copper. The spent etching solution comprises from about 1 moles/liter to about 20 moles/liter total chloride, preferably from about 2 moles/liter to about 14 moles/liter total chloride, and typically from about 6 moles/liter to about 10 moles/liter total chloride. To ensure completion of the reaction, the amount of sulfuric acid added is in excess of the amount necessary for converting $CuCl_2$ to HCl and $CuSO_4$. The reaction can occur in a reactor or a distillation column. In one embodiment of the invention, the amount of sulfuric acid in the original mixture of sulfuric acid and spent etching solution is at least 30 weight %. In another embodiment of the invention, the amount of sulfuric acid in the original mixture of sulfuric acid and spent etching solution is at least 40 weight %. In another embodiment of the invention, the amount of sulfuric acid in the original mixture of sulfuric acid and spent etching solution is at least 50 weight %. In another embodiment of the invention, the amount of sulfuric acid in the original mixture of sulfuric acid and spent etching solution is at least 60 weight %. Alternatively, the amount of sulfuric acid added is at least one half the molar amount of dissolved chloride, preferably at least one times the molar amount of dissolved chloride, and more preferably at least two times the molar amount of chloride.

Substantially all of the chloride in the spent etching solution is recovered as hydrochloric acid in subsequent steps of the process. The reaction of the spent etching solution with sulfuric acid accomplishes two tasks. First, as discussed above, it converts the $CuCl_2$ in the spent etching solution to HCl and $CuSO_4$. Second, it exploits the difference in boiling point between sulfuric acid (boiling point about 340° C.) and hydrochloric acid (boiling point about 110° C.) to allow for an effective separation of sulfuric acid from HCl/water through distillation.

In one preferred process, the mixture of spent etching solution and sulfuric acid is subjected to steam distillation at approximately atmospheric pressure (plus or minus about 0.2 atm.) to achieve the required vaporization of HCl from the residual liquid. In this process, a portion of condensed hydrochloric acid can be refluxed back into the top of the reactor (or distillation column). Also in this process, the resultant residual liquid would contain, in addition to the sulfuric acid and $CuSO_4$ typically present, would comprise additional water. This liquid can be fed to an evaporator, to remove a portion of the water, prior to separating the $CuSO_4$ from the sulfuric acid. The evaporator has an external heat source. The water vapors from the evaporator are fed to a condenser and are discharged as a wastewater stream. The concentrated mixture is then fed to the separations unit, wherein the $CuSO_4$ is separated from the sulfuric acid.

A portion of the $CuSO_4$ may be separated from the residual liquid at any time after adding the sulfuric acid. Generally, however, at least a portion of the copper will stay in a complexed $CuCl xH_2O$ form until hydrochloric acid is removed, so there is typically an additional $CuSO_4$ recovery step after removing HCl. Also, delaying separation of $CuSO_4$ until after recovery of HCl and water will provide a higher purity of $CuSO_4$ with less contaminants such as $CuCl_2$ present in or on the $CuSO_4$ precipitate. In another process, the residual mixture after removing HCl is fed to a horizontal thin film evaporator for conversion of $CuCl_2 xnH_2O$ to $CuSO_4$. This process eliminates the need for a separator. Such a unit will, by virtue of the large surface area between an inert gas and the $H_2SO_4$-supplemented spent etchant, result in effective removal of HCl and some water.

In another preferred process, the mixture is subjected to flash distillation under reduced pressure. The pressure can be, for example, from about 0.7 atmospheres to about 0.99 atmospheres pressure (absolute), preferably from about 0.85 atm to about 0.95 atm.

Whether it process operates by steam distillation, flash distillation, or another type of distillation, the reactor (or distillation column) is maintained at a high enough temperature to vaporize the HCl and provide favorable kinetic conditions for the conversion of $CuCl_2$ to $CuSO_4$. In the preferred process in which steam distillation is employed, such temperatures can range from about 70° C. to about 150° C., or preferably from about 100° C. to about 120° C., for example from about 105° C. to about 110° C. at about atmospheric pressure. In the preferred process in which flash distillation is employed, the distillation can also occur at temperatures of 70° C. to 150° C., or preferably from 80 to 110° C., for example from 90° C. to 100° C.

The process can be operated in either a continuous or a batch mode. The high temperature in the reactor (or distillation column) can be achieved using numerous techniques, including, but not limited to, the direct or indirect application of steam to the reactor. The vapor that exits the reactor is condensed for recovery as hydrochloric acid. The concentration of hydrochloric acid in this recovered stream can range from about 5 moles HCl/liter to about 15 moles HCl/liter, but is preferably at a concentration where it is readily use to formulate new etchant, for example from about 8.5 moles HCl/liter to about 12 moles HCl/liter, typically from about 9.5 moles HCl/liter to about 10.5 moles HCl/liter. At such concentrations, the recovered HCl can readily be used to formulate new etchant solution without complicated concentration steps.

Generally, the recovery of hydrochloric acid takes some time. Sparging the acidified composition with an inert gas, for example nitrogen or air, and optionally but advantageously recyling this air after condensing out the water and hydrochloric acid in the condenser, can be used to accelerate the removal of hydrochloric acid from the composition. The addition of substantial excesses of sulfuric acid promotes the conversion of copper chloride, which can exist as dissolved ions and/or as a compound complexed with a plurality of water molecules, into volatile hydrochloric acid and precipitated copper sulfate (in anhydrous form, in monohydrated form, and/or in pentahydrated form). The heat and refluxing during the removal of hydrochloric acid will help remove entrained copper chloride from the precipitated crystals. The progressive conversion and removal of copper chloride from the composition will result in progressively less copper chloride in the copper sulfate precipitate, present in the form of contaminants in the crystals, as fluid inclusions, or even as fluid wetting the copper sulfate precipitate. For this reason, it is generally preferred to aggressively strip hydrochloric acid from the composition, and also to not separate and recover the copper sulfate precipitate until the composition is substantially free of hydrochloric acid, e.g., the precipitate is left in contact with the fluid until the chloride level in the fluid is advantageously reduced to less than 2%, preferably less than 1%, more preferably less than 0.5% by weight, based on the weight of the composition.

The resultant mixture, which substantially comprises sulfuric acid and $CuSO_4$, is fed to a separations unit to separate the $CuSO_4$ from the sulfuric acid. The separation can be performed through techniques that include, but are not limited to, filtration and centrifugation. The process can further comprise washing the precipitated $CuSO_4$ to increase its purity. The precipitated $CuSO_4$ will be at 85 weight % pure, preferably at least 90 weight % pure, and more preferably at least 98 weight % pure copper sulfate monohydrate, copper sulfate pentahydrate, or mixtures thereof. The precipitated $CuSO_4$ can subsequently be used as a wood preservative. Advantageously, the weight percent chloride (as copper chloride) in the recovered precipitate is less than about 8%, preferably less than about 4%, and more preferably less than about 2%, for example between about 0.1% to about 1% by weight (as copper chloride). Chloride is not desired in the precipitate, because chlorides can promote undesirable corrosion of metal fasteners in wood treated with a copper chloride-containing material.

After the recovery of the hydrochloric acid and the separation of the CuSO4, the residual liquid is processed for reuse as a sulfuric acid source. Often, little or no processing is needed. The concentration of the recovered sulfuric acid in this residual liquid can vary, but is usually in the range of 40 to about 75 weight %. If the concentration is lower than 45%, the concentration can readily be increased by removal of water, for example by distillation. A small waste stream comprising a minor portion of this liquid can be discarded, to prevent buildup of salts. To make up for losses, sulfuric acid and/or oleum can be added to the material. Concentrated sulfuric acid having a weight percentage of from about 90 weight % to about 99.9 weight % can be mixed with the recovered sulfuric acid to boost its concentration, and to provide sufficient sulfuric acid necessary for mixing with the spent etching solution. Fuming sulfuric acid, e.g., oleum, can be added in lieu of a portion of the newly-added sulfuric acid, especially if there is excess water present.

Distillation processes generally require the addition of large quantities of heat energy. Advantageously, the process is performed in a manner to conserve heat. For example, the sulfuric acid and copper sulfate are heated to distill off the hydrochloric acid. This heat can be conserved by separating the precipitated copper sulfate from the residual sulfuric acid/water-containing liquid at or near the temperature of the distillation. The heated aqueous sulfuric acid can then be admixed with new newly arriving spent chloride-containing copper etchant fluid. The latent heat of the aqueous sulfuric acid composition, plus the heat generated by combining the aqueous acid (plus any make-up sulfuric acid added) with the spent etchant, will substantially pre-heat the composition to near or at the proposed distillation temperature needed to remove hydrochloric acid. Additionally, heat recovered by condensing the hydrochloric acid can be used to pre-heat newly arriving spent acid. Generally, heat exchangers are not depicted in the drawings, as it is within the skill of one of ordinary skill in the art to provide appropriate heat exchangers and the like to conserve and re-utilize heat energy.

Figure 2:
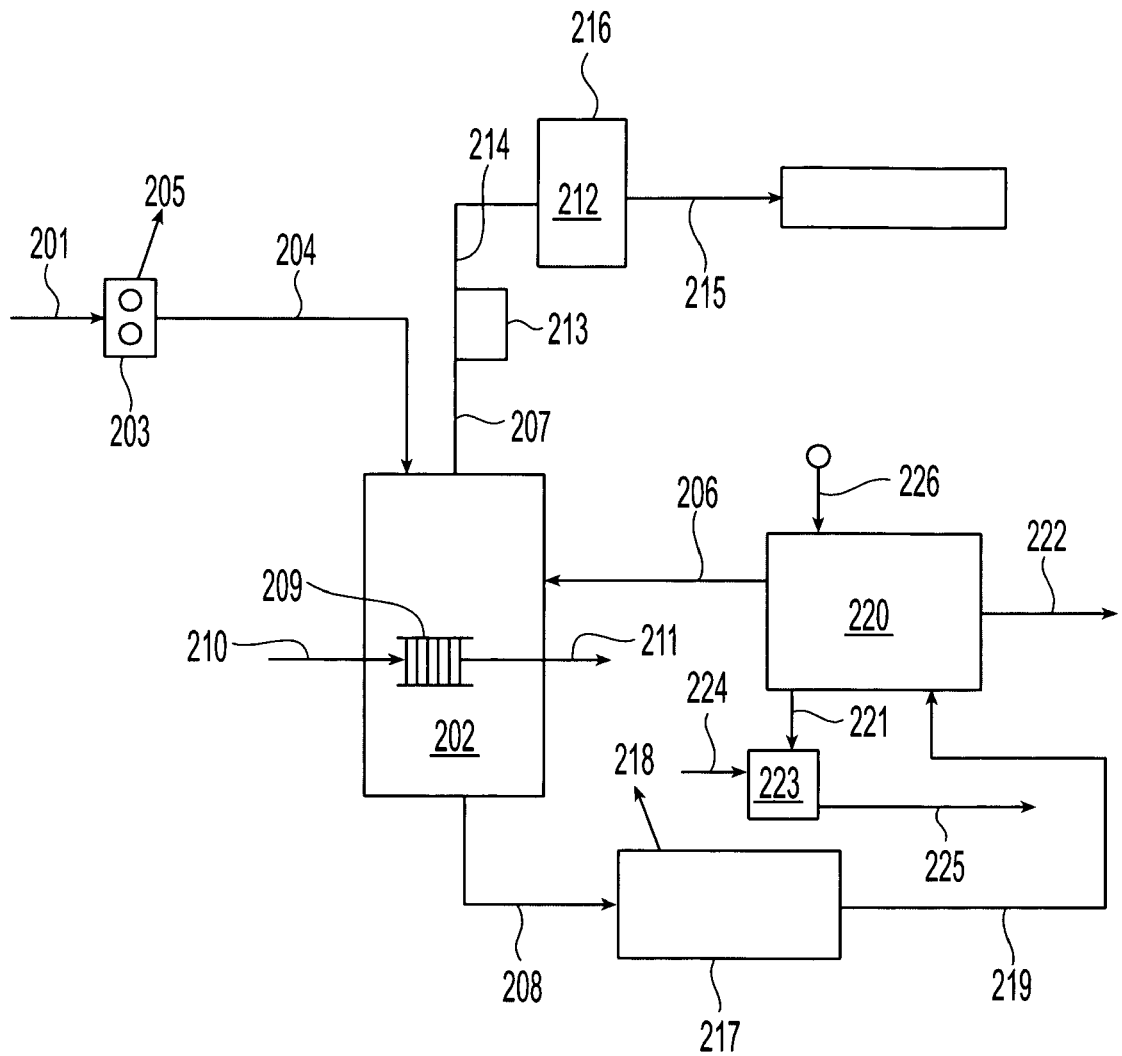
FIG. 2 is a schematic of the in-house recycle process as used in the continuous mode.
Figure 3:
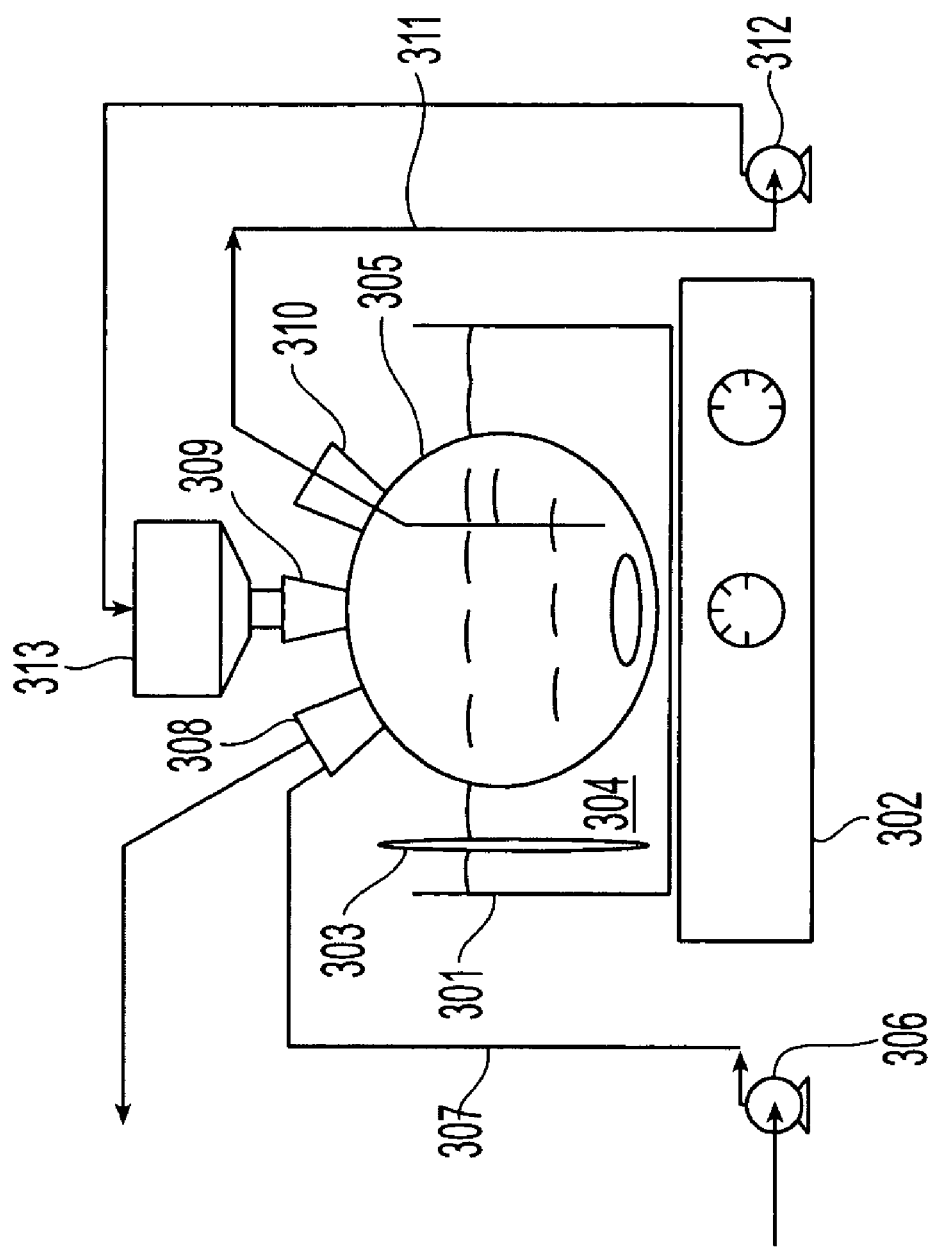
FIG. 3 is an illustration of the laboratory apparatus used in examples 1–6.

FIGS. 1, 2, and 3 depict an overview of the basic components of a continuous process (FIGS. 1, 3) or a batch process (FIGS. 2, 3). It should be appreciated that there is little difference in the schematic of the most preferred embodiments of the batch and continuous process equipment. Most of the differences are in the operation.

FIG. 1 depicts an overview of the in-house recycle process in the batch mode. Spent acidic etching solution comprising hydrochloric acid and $CuCl_2$ flows through line 101 to reactor 103, where it is mixed with concentrated sulfuric acid, which enters reactor 103 through line 102. The temperature in reactor 103, which is adjusted to both allow for the conversion of $CuCl_2$ to $CuSO_4$ and to vaporize HCl, is beneficially greater than about 70° C. The HCl vapors are directed through line 104 to condenser 105, wherein aqueous liquid hydrochloric acid is condensed. While it is desirable to also remove water from the mixture, the conditions in reactor 3 should be maintained to provide a concentration of HCl in the condensate that is usable in formulating new etchant solution. The residue from reactor 103, which comprises sulfuric acid and $CuSO_4$, is directed through line 106 to separator 107, wherein the solid $CuSO_4$ crystals are separated from the liquid sulfuric acid. The sulfuric acid is then directed through line 8 back to the reactor for reuse.

In the continuous process of FIG. 2, spent acidic etching solution comprising hydrochloric acid and $CuCl_2$ flows through line 201 to reactor 202. Optionally, the fluid is pumped, preheated, and/or the water is evaporated (requiring a heat source) in unit 203, and then continues to the reactor via line 204. If the etchant is concentrated by removing water, water vapor exiting via line 205 can be vented or treated. Pumping, preheating, and/or dewatering are all beneficially performed before admixing the etchant with the sulfuric acid provided by line 206. Sulfuric acid, typically aqueous sulfuric acid, is admixed with the spent etchant in the reactor, or alternatively to facilitate mixing in a volume just before the reactor 202. The sulfuric acid, typically aqueous sulfuric acid, is conveyed to the spent etchant via line 206. The sulfuric acid/spent etchant composition then enters the reactor 202, which may comprise a distillation apparatus or trays in the top part thereof. The reactor should be adapted to handle a slurry, and to separate evolving water vapor and hydrochloric acid vapor away from the reactor, for example by conveying the vapors out of the reactor via line 207 while conveying the slurry of aqueous sulfuric acid/copper sulfate away from the reactor via line 208. Heat energy is added to the reactor 202, for example via heat exchanger 209, which may utilize a heating fluid, which enters the heat exchanger via line 210 and exits via line 211 once it has provided the required increment of energy. The temperature is adjusted to both allow for the conversion of $CuCl_2$ to $CuSO_4$ and to vaporize HCl, and it is beneficially greater than about 70° C. The HCl vapors are directed through line 207 to condenser 212, where there is optionally included a pump, typically a vacuum pump 213, disposed either before or after the condenser 212, where line 214 may be included to convey vapors from the pump 213 to the condenser 212 if the pump 213 is disposed between the reactor 202 and the condenser 212. Two streams generally exit condenser 212—the condensed and recovered aqueous hydrochloric acid via line 215, while uncondensables may be vented via line 216. Generally, the location of the pump relative to the condenser will influence the quantity and concentration of the aqueous hydrochloric acid recovered from condenser 212. While it is desirable to also remove water from the mixture, the conditions in this first reactor should be maintained to provide a concentration of HCl in the condensate in line 215 that is usable in formulating new etchant solution. The residual slurry from reactor 202, which comprises sulfuric acid and $CuSO_4$, is directed through line 208 to optional evaporator 217 with vent 218 for venting water vapor and conveyance line 219, to a solid/liquid separator 220. In the separator 220, the solid $CuSO_4$ crystals are separated from the liquid sulfuric acid and exit the separator via line 221 or 222. The sulfuric acid is then directed through line 206 back to the reactor 202 for reuse. The separated copper sulfate solids will contain sulfuric acid, both wetting the liquid and as inclusions in the solids. Advantageously, the solids are washed in washer 223 with water supplied via line 224, and then again dewatered or conveyed out via line 225 as a slurry. The water wash may comprise base, for example lime, to further neutralize any residual acid. If fresh make-up acid needs to be supplied, it can be supplied via line 226, and if a small sidestream must be withdrawn to control salt buildup, it can be withdrawn via line 222. In such a steady state process, the amount of chloride in the slurry in reactor 202 is kept low, to minimize the copper chloride contamination of the recovered copper sulfate. The amount of copper chloride is advantageously less than 4 parts by weight, for example between 0.1 and 2 parts by weight, per 100 parts of slurry in reactor 10.

FIG. 3 depicts an apparatus used in a small pilot plant for producing the data in examples 1–6. FIG. 3 is also useful in batch processing, though it should be recognized that some tanks needed to store materials for batch processing are not shown in FIGS. 2 and 3. In FIG. 3, reactor (beaker) 301 is in contact with hot plate 302, which serves to provide heat to the heat exchanger (water bath) 304, and the water bath or heat exchanger 304 is disposed to provide heat to reactor 305. Thermometer 303 rests in water bath 304 to monitor the water temperature. Pump 306 is used to pump $CuCl_2$ and sulfuric acid through line 307 into port 308 of reactor 305. The appropriate temperature is achieved in water bath 304, and thus in reactor 305, using the controls on hot plate 302. Once the appropriate reaction conditions are met (i.e., temperature and residence time), the $CuCl_2$ is converted to $CuSO_4$. Concurrently, a partial vacuum is pulled on reactor 305 through port 308 to extract HCl and water vapor. A recirculation loop for the sulfuric acid and the $CuSO_4$ mixture is in place to operate continuously during the distillation reaction. Filter 313 is used in the recirculation loop to separate the $CuSO_4$ crystals from the sulfuric acid.

Line 311 exits port 310 of reactor 305 and reenters the reactor through port 309. Pump 312 is used to recirculate the sulfuric acid and $CuSO_4$ through line 311. Filter 313 is positioned above port 309 at the end of the recirculation loop. A recirculation loop for the sulfuric acid and $CuSO_4$ mixture optionally but advantageously is in place to operate continuously during the distillation reaction, to help mix the fluid and to provide contact between the slurry and the vapors. The remaining units are understandable from the unit operations performed by similarly numbered units in the schematic for the steady state process. One difference is that copper sulfate will begin to precipitate in a slurry having a high copper chloride content, but the copper chloride content of the slurry will decline and eventually approach zero. The first precipitate to form will likely have a higher degree of copper chloride contamination than would precipitate formed later in the process. The recycling of slurry and the aging of the precipitate during the batch process can reduce the copper chloride content of the earlier-formed precipitate.

Generally, when the ratio of moles sulfate to moles dissolved copper in the compositions added to a reactor exceed 3.5:1, then the residual amount of copper in the fluid is very small, e.g, less than 20 grams per liter. Generally, by the time an equimolar amount of sulfate is added as copper was present, essentially all (>95%) of the copper sulfate precipitation will typically have occurred. The concentration of this precipitate is therefore controlled primarily by the conditions that exist in the early part of the process.

High concentrations of sulfuric acid and concurrent low concentrations of water favor the formation of the monohydrate form of copper sulfate. If the sulfuric acid concentration is greater than 70% by weight, for example from 85% to 98% by weight, and the water concentration is less than 28% by weight, say between 2% and 14% by weight, then the monohydrate form of copper sulfate appears to predominate. Product may contain 70% or more, and possibly 90% or more by weight of copper sulfate in the anhydrous form (rare) and monohydrate form (more common).

Intermediate concentrations of sulfuric acid and concurrent intermediate concentrations of water favor the formation of the pentahydrate form of copper sulfate. If the sulfuric acid concentration is about 50%, say between about 40% and 55% by weight, and the water concentration is greater than 25% by weight, for example between 30% and 40% by weight, then the pentahydrate form of copper sulfate appears to predominate. The product may contain typically 40% to 80%, and rarely more than 80% by weight, of copper sulfate in the pentahydrate form.

While it is possible to make a product that has more than 80% by weight copper sulfate in the pentahydrate form, such compositions typically have so much water that the recovered hydrochloric acid concentration is too low for use in preparing new etchant, unless there are energy-intensive concentrator process steps to partially de-water the spent etchant. Energy expenditures are more favorable when the amount of water in the compositions is kept low. Therefore, in most preferred embodiments of the invention, the monohydrate form of copper sulfate is the preferred product. If, however, the spent etchant has a large quantity of water therein, it is often beneficial to try to provide a mostly copper sulfate pentahydrate product.

In most commercial processes, the product will contain significant portions, e.g., greater than 20 mole percent, of both copper sulfate monohydrate and copper sulfate pentahydrate. This does not present any problems if the end use, such as wood preservation of preparing fungicides for foliar applications, does not rely on one purity over another.

EXAMPLES

The process of the invention is illustrated by the following examples, which are merely indicative of the nature of the present invention, and should not be construed as limiting the scope of the invention, nor of the appended claims, in any manner.

Example 1

A 25 ml cupric chloride solution containing 129-g/L copper and 65-g/L HCl was mixed with 31.3 grams of concentrated sulfuric acid (97% by weight sulfuric acid). This aqueous composition comprised about 0.066 moles copper, 0.177 moles chloride, and 0.31 moles sulfuric acid. The mixture solution, which initially contained about 50% sulfuric acid by weight and between about 35% water by weight, was distilled under a slight vacuum (using a water-pump) at 130° C. for 35 minutes. After the distillation, a light blue-colored solution/crystal mixture was obtained. The mixture was allowed to cool down and then filtered. About 25-ml filtrate and 9.7 gram of light blue-colored copper sulfate crystals were collected. After drying in a 50° C. oven overnight, the crystals (formed from a composition having a molar ratio of sulfate to copper of about 4.7:1, about 50% sulfuric acid and about 35% water at 130° C.) were found to contain 28.3% copper, 1.5% sulfuric acid and 0.5% free moisture. The filtrate contained 2.37-g/L chloride and 15-g/L copper with a specific gravity of 1.51 g/cc. The condensate was partially collected during the distillation and contained 196-g/L HCl, or about 5.3 moles HCl/L. The mass balance showed that material was lost during this process. Nevertheless, a residual of 15 g/L dissolved copper suggests more than 80 of the copper was precipitated. Because copper sulfate monohydrate has 35.8% by wt. copper, and copper sulfate pentahydrate has 25.4% copper, a composition having a copper content of 34.8% would be expected to have 90 mole % monohydrate and 10 mole % pentahydrate; a composition having a copper content of 30.6% would be expected to have 50 mole % monohydrate and 50 mole % pentahydrate; and a composition having a copper content of 28% would be expected to have 25 mole % monohydrate and 75 mole % pentahydrate. The precipitate recovered during this experiment had 28.3% Cu, suggesting the material had about 2.5 parts copper sulfate monohydrate per 7.5 parts of copper sulfate pentahydrate.

Example 2

A mixture of 30 ml of a cupric chloride solution (245.4-g/L copper (from copper chloride) and 35-g/L HCl at 1.407 g/cc density) and 42.2 g of sulfuric acid was distilled at 120° C. for 35 minutes under slight vacuum. The composition originally contained 0.116 moles Cu, 0.26 moles Cl, and 0.41 moles $H_2SO_4$. About 26 grams of copper sulfate crystals and 38 grams of filtrate were obtained. The crystals contained 28.1% copper, again suggesting the material had about 2.5 parts copper sulfate monohydrate per 7.5 parts of copper sulfate pentahydrate. The filtrate was a light blue solution containing 72.6% by weight sulfuric acid and 5 g/L copper, with a specific gravity of 1.33 g/cc. The recovery of copper as copper sulfate was about 90%.

Example 3

A mixture of 42.2 ml of cupric chloride solution (245.4-g/L copper and 35-g/L HCl at 1.407 g/cc density) and 21.1 grams of sulfuric acid was distilled at 125° C. for 60 minutes under slight vacuum. This composition originally comprised 0.163 moles copper, 0.366 moles Cl, and 0.209 moles sulfuric acid. The initial mixture solution contained about 33% sulfuric acid by weight. A light blue-colored thick solution was obtained after distillation. Upon cooling, the liquid crystallized to form light blue-colored copper sulfate crystals. No filtrate was recovered. The material probably comprised about 20% by weight sulfuric acid, which was not readily separable from the solids.

Example 4

The reactor was initially charged with 400 ml of a solution containing 93% by weight sulfuric acid. The solution was agitated and heated to 85±5° C. The addition of cupric chloride (134.1 g/L copper, 65 g/L HCl) was started and maintained at a constant rate of 2 ml/min. For each addition of 300 ml of cupric chloride solution, about 100 ml of concentrated sulfuric acid was added into the reactor. During the distillation reaction, the copper sulfate crystals were formed and removed continuously through a filter funnel mounted on the top of the reactor. After the addition of a total of 900 ml of cupric chloride and 300 ml of sulfuric acid solutions, the total solution volume reached a steady state of about 600 ml. The liquid contained about 70% by weight sulfuric acid and 5 g/L copper. The copper sulfate crystals obtained were light blue in color. The unwashed crystals contained 35% copper and 8.1% sulfuric acid. This suggests the material had about 9 parts copper sulfate monohydrate per part of copper sulfate pentahydrate. A total of about 8.5 moles sulfuric acid, 5.4 moles Cl, 1.9 moles Cu, and 49 moles water were added to the reactor. Copper recovery was greater than 97%.

Example 5

Water was added to the reaction heel of Example 5 to dilute the sulfuric acid concentration to about 50%. Cupric chloride solution was added to the reactor at a rate of 2 ml/min. No sulfuric acid was further added. The distillation temperature was maintained at about 85±5° C. Samples of solution and copper sulfate crystal were taken at several stages of cupric chloride addition. The results are listed below.

| CuCl$_2$ added, | Solution | | Copper Sulfate Crystals (unwashed) | |
|---|---|---|---|---|
| ml | H$_2$SO$_4$, % | Copper, % | H$_2$SO$_4$, % | Copper, % |
| 300 | 50 | 0.38 | 7.8 | 30.4 |
| 700 | 51 | 0.65 | 6.5 | 31.0 |
| 900 | 55 | 1.30 | 6.1 | 31.9 |

During the cupric chloride additions, sulfuric acid in the reaction heel was continuously consumed but maintained at a near steady state concentration of 50%. This suggests there was a faster evaporation rate than 2 ml/min of cupric acid added, but the data should be viewed with caution. When the sulfuric acid is maintained at about 70% by weight, crystals having about 35% copper were recovered. When the sulfuric acid is maintained at about 50% by weight sulfuric acid, the copper content of recovered crystals fell to 30.4% (suggesting a mixture of about 1 part copper sulfate monohydrate to 1 part copper sulfate pentahydrate, by weight). Increasing the sulfuric acid content to 55% by weight correlated with the copper content of crystals rising to 31.9% (suggesting a mixture of 6 parts copper sulfate monohydrate to 4 part copper sulfate pentahydrate, by weight).

Example 6

The reactor was initially charged with 150 ml concentrated sulfuric acid (98%). The solution was agitated and heated to 85±5° C. The addition of cupric chloride (134.1 g/L copper, 65 g/L HCl) was started and maintained at a constant rate of 2 ml/min. After finishing addition of 200 ml cupric chloride solution, the distillation reaction was allowed to continue for about 30 minutes prior to the separation of copper sulfate crystals from the solution. The composition in the reactor changed continuously during this test, with initial copper sulfate precipitation occurring from a composition having more than 95% sulfuric acid and very little water, while the last copper sulfate to precipitated from a composition having about 60% sulfuric acid and about 39% water. To the initial charge of 1.84 moles sulfuric acid eventually was added 0.42 moles Cu, and 1.2 moles Cl. The end concentration of H$_2$SO$_4$ was 60%. The mass balance for this experiment is given below.

| Item | Copper, g | H2SO4, g | Chloride, g | |
|---|---|---|---|---|
| Input | 26.82 | 269 | 42.6 | 850.2 |
| Output Stream | | | | |
| Crystals | 23.54 | 38.3* | 0.03 | 73.2 |
| Filtrate | 3.00 | 213.8 | 0.21 | 355.5 |
| NaOH scrubber | 0.0 | — | 42.39 | 372.7 |
| Total | 26.54 | 218.6 | 42.6 | 801.4 |
| Recover, % | 99.0 | 93.7 | 100 | 94.3 |

*This assumes there was 2 moles copper sulfate monohydrate per mole of copper sulfate pentahydrate in the recovered crystals, so the material will contain about 49% sulfate. The copper sulfate monohydrate form comprises 54 weight percent sulfate, while copper sulfate pentahydrate comprises 38 weight percent sulfate.

The solids separation was conducted in a filter funnel and no water wash of the crystals was applied. The copper sulfate crystals weighed about 73.2 g and contained 32.17% copper and 6.61% sulfuric acid. The copper sulfate material probably contained about 2 moles of monohydrate form per mole of pentahydrate form. About 236 ml (355.5 grams) filtrate was collected. It contained 12.7 g/L copper, 906 g/L sulfuric acid and 0.869 g/L chloride. During the distillation, hydrochloric acid vapor was absorbed using a caustic solution (325.7 g at 23.9%).

There was excellent mass balances for most components. A total of about 200 ml cupric chloride solution was added to the composition. The filtrate comprised about 140 grams of water, so the vapors contained approximately equal weights of water and hydrochloric acid, suggesting that had the vapor been condensed then concentrated (~38%) hydrochloric acid would have been recovered.

The invention is meant to be illustrated by these examples, but not limited to these examples.

What is claimed is:

1. A process for the regeneration of a spent etching solution comprising dissolved copper chloride, the process comprising the steps of:

(a) providing a spent etchant comprising at least about 10% by weight chloride and at least about 5% dissolved copper;
(b) adding at least about 2 moles of sulfuric acid per mole of dissolved copper to the spent etching solution, thereby converting copper chloride into hydrochloric acid and precipitated copper sulfate;
(c) distilling the mixture from step (b) to vaporize at least a portion of the hydrochloric acid;
(d) condensing at least a portion of the vaporized hydrochloric acid;
(e) separating at least a portion of the precipitated copper sulfate from the residual liquid, wherein said residual liquid comprises sulfuric acid; and
(f) reusing at least a portion of the residual liquid as a sulfuric acid source in step (b).

2. The process of claim 1, wherein the process operates on a continuous basis, and wherein the spent etchant, the sulfuric acid, or both further comprise at least one mole of water per mole of dissolved copper in the spent etchant.

3. The process of claim 1, wherein the process operates on a batch basis, and wherein the spent etchant, the sulfuric acid, or both further comprise at least one mole of water per mole of dissolved copper in the spent etchant.

4. The process of claim 1, wherein the quantity of sulfuric acid added is at least about 3 moles of sulfuric acid per mole of dissolved copper in the spent etchant.

5. The process of claim 1, wherein the quantity of sulfuric acid added is at least about 3.5 moles of sulfuric acid per mole of dissolved copper in the spent etchant.

6. The process of claim 1, wherein the quantity of sulfuric acid added is between about 4 moles and about 6 moles sulfuric acid per mole dissolved copper in the spent etchant.

7. The process of claim 1, wherein the quantity of sulfuric acid added is between about 3.5 moles and about 5 moles sulfuric acid per mole dissolved copper in the spent etchant.

8. The process of claim 1, wherein at least 4 parts by weight of sulfuric acid added per 6 parts by weight of spent etchant.

9. The process of claim 1, wherein at least 5 parts by weight of sulfuric acid added per 5 parts by weight of spent etchant.

10. The process of claim 1, wherein at least 6 parts by weight of sulfuric acid added per 4 parts by weight of spent etchant.

11. The process of claim 1, wherein the distillation in step (c) occurs at a temperature of from about 95° C. to about 135° C.

12. The process of claim 1, wherein the distillation in step (c) occurs at a temperature of from about 120° C. to about 135° C.

13. The process of claim 1, wherein the distillation in step (c) occurs at a pressure of less than about 1 atm.

14. The process of claim 13, wherein the distillation in step (c) occurs at a pressure of from about 0.7 to about 0.99 atm.

15. The process of claim 1, wherein the separated copper sulfate comprises residual liquid, the process further comprising contacting the separated copper sulfate with a base to neutralize at least a portion of the sulfuric acid in the residual liquid contacting the separated copper sulfate.

16. The process of claim 1, wherein the precipitated copper sulfate is separated from the residual liquid comprising sulfuric acid by centrifugation.

17. The process of claim 1, wherein the recovered hydrochloric acid comprises at least about 8 moles hydrochloric acid per liter, further comprising the step of formulating at least a portion of the condensed hydrochloric acid into a copper etchant.

18. The process of claim 1, wherein the spent etching solution in step (a) comprises from about 4 to about 8 moles per liter total chloride.

19. The process of claim 1, wherein step (a) further comprises concentrating the spent etchant to at least about 20 weight % chloride.

20. The process of claim 1, wherein step (a) further comprises concentrating a spent etching solution to provide a spent etchant comprising at least about 30 weight % chloride.

21. The process of claim 1, wherein the separated copper sulfate comprises at least about 90% by weight of copper sulfate pentahydrate and/or copper sulfate monohydrate.

22. The process of claim 21, wherein more than 60 mole percent of the separated copper sulfate comprises copper sulfate pentahydrate.

23. The process of claim 21, wherein more than 60 mole percent of the separated copper sulfate comprises copper sulfate monohydrate.

24. The process of claim 21, wherein more than 80 mole percent of the separated copper sulfate comprises copper sulfate monohydrate.

25. The process of claim 1, further comprising the step of converting at least a portion of the separated copper sulfate into a form where wherein the copper can be injected into wood, and injecting the copper into wood as a wood preservative.

26. The process of claim 1, further comprising the step of converting at least a portion of the separated copper sulfate into a fungicidal composition.

27. The process of claim 1, further comprising the step of washing the separated copper sulfate to further remove residual liquid.

28. The process of claim 1, wherein the composition comprising reaction products of the spent etchant and sulfuric acid is steam distilled to vaporize more than 98% of the chloride in the composition as hydrochloric acid.

29. The process of claim 1, wherein at least about 90 weight % of the Cu in the spent etchant is recovered as separated copper sulfate.

* * * * *